United States Patent
Yanagimachi et al.

(10) Patent No.: US 7,013,656 B2
(45) Date of Patent: Mar. 21, 2006

(54) VEHICLE VENTILATION AND DEODORIZATION SYSTEM

(75) Inventors: Yoshinori Yanagimachi, Takahama (JP); Makoto Umebayashi, Chiryu (JP); Tomohiro Inada, Kariya (JP)

(73) Assignee: DENSO Corpration, Kariya (JP)

( * ) Notice: Subject to any disclaimer, the term of this patent is extended or adjusted under 35 U.S.C. 154(b) by 0 days.

(21) Appl. No.: 10/822,840

(22) Filed: Apr. 12, 2004

(65) Prior Publication Data

US 2004/0200228 A1    Oct. 14, 2004

(30) Foreign Application Priority Data

Apr. 14, 2003  (JP)  ............... 2003-109282

(51) Int. Cl.
*F25B 49/00*   (2006.01)
(52) U.S. Cl. ............... 62/126; 62/186; 454/75; 454/158; 165/202; 165/237
(58) Field of Classification Search ............ 62/78, 62/180, 186, 244, 126, 230; 545/75; 165/202, 165/237; 454/75, 157, 158
See application file for complete search history.

(56) References Cited

U.S. PATENT DOCUMENTS

| | | | | |
|---|---|---|---|---|
| 4,309,382 A | * | 1/1982 | Miller | 422/4 |
| 5,078,046 A | * | 1/1992 | Mascolo et al. | 454/157 |
| 5,297,988 A | * | 3/1994 | Nishino et al. | 454/75 |
| 5,509,852 A | * | 4/1996 | Clark | 454/75 |
| 5,595,064 A | * | 1/1997 | Ikeda et al. | 62/126 |
| 5,656,916 A | * | 8/1997 | Hotta | 320/160 |
| 5,681,218 A | * | 10/1997 | Kishi et al. | 454/75 |
| 5,721,550 A | * | 2/1998 | Lopez | 341/176 |
| 5,833,929 A | * | 11/1998 | Watson et al. | 422/123 |
| 6,168,515 B1 | * | 1/2001 | Daimon et al. | 454/75 |
| 6,414,586 B1 | * | 7/2002 | Yoshizawa | 340/5.2 |
| 6,429,542 B1 | * | 8/2002 | Furuya et al. | 307/9.1 |
| 6,723,146 B1 | * | 4/2004 | Ninomiya et al. | 55/344 |
| 2003/0231131 A1 | * | 12/2003 | Dimig et al. | 341/176 |

FOREIGN PATENT DOCUMENTS

| | | | |
|---|---|---|---|
| JP | 55-140051 A | * | 11/1980 |
| JP | 6-227248 | | 8/1994 |
| JP | 2000-60949 A | * | 2/2000 |

* cited by examiner

*Primary Examiner*—Mohammad M. Ali
(74) *Attorney, Agent, or Firm*—Harness, Dickey & Pierce, PLC

(57) ABSTRACT

A ventilation and deodorization system includes a door lock switching unit for performing a locking and an unlocking of a vehicle door, an air conditioner which introduces outside air of a passenger compartment of the vehicle and blows the introduced outside air into the passenger compartment in a ventilation operation, and a control device for controlling its operation. When a door unlocking request signal is received as a remote operation signal by a receiving unit, the door lock switching unit performs the unlocking of the vehicle door, and the air conditioner performs the ventilation operation. Alternatively, an air cleaning operation is performed instead of the ventilation operation, while inside air of the passenger compartment is cleaned and circulated by an air cleaning device. Thus, the ventilation operation or the air cleaning operation can be performed while a battery consumption amount can be reduced.

13 Claims, 5 Drawing Sheets

VEHICLE VENTILATION AND DEODORIZATION SYSTEM

CROSS REFERENCE TO RELATED APPLICATION

This application is based on Japanese Patent Application No. 2003-109282 filed on Apr. 14, 2003, the disclosure of which is incorporated herein by reference.

FIELD OF THE INVENTION

The present invention relates to a vehicle ventilation and deodorization system which effectively removes an uncomfortable odor of a passenger compartment generated in parking, at a time immediately before a passenger gets in the passenger compartment.

BACKGROUND OF THE INVENTION

In a conventional vehicle, the odor due to breeding of various kinds of minor germs or the odor due to an interior decoration is filled in a sealed passenger compartment in parking, and an uncomfortable feeling may be given to a passenger (driver) when the passenger gets in the passenger compartment. To overcome this problem, a blower of a vehicle air conditioner may be driven and operated in vehicle parking. However, in this case, the blower cannot be operated for a long time due to a limited battery capacity while a vehicle engine is stopped. Further, when the blower is operated with a low rotation speed in order to protection of the battery, the odor cannot be sufficiently removed.

In a vehicle perfume-generating device described in JP-A-6-227248, an aromatic substance or a deodorant is not supplied to a passenger compartment when a passenger does not get in the passenger compartment, and the aromatic substance or the deodorant is supplied into the passenger compartment together with air from an air conditioner at a time where the passenger gets in the passenger compartment. However, in this case, the aromatic substance or the deodorant cannot be supplied to an all area of the passenger compartment when the passenger quickly gets in the passenger compartment.

SUMMARY OF THE INVENTION

In view of the above-described problems, it is an object of the present invention to provide a vehicle ventilation and deodorization system which effectively ventilates or/and deodorizes a passenger compartment at a time immediately before a passenger gets in the passenger compartment while a battery consumption amount in a parking can be effectively reduced.

According to an aspect of the present invention, a vehicle ventilation and deodorization system includes a receiving unit disposed to receive a remote operation signal from a portable terminal, a door lock switching unit for performing a locking and an unlocking of a vehicle door, an air conditioner which introduces outside air of a passenger compartment of the vehicle and blows the introduced outside air into the passenger compartment in a ventilation operation, and a control device for controlling operation of the door lock switching unit and the air conditioner. In this system, when a door unlocking request signal is received as the remote operation signal by the receiving unit, the door lock switching unit is controlled by the control device to perform the unlocking of the vehicle door, and the air conditioner is controlled by the control device to perform the ventilation operation. Therefore, from a time where the door lock is released by the remote operation of the portable terminal of a keyless entry or a smart key, the ventilation operation is performed. That is, immediately before a passenger gets in the passenger compartment, the ventilation operation is performed, so that the outside air introduction mode is set and the passenger compartment is ventilated. Thus, the odor in the passenger compartment can sweep away at a time immediately before the passenger gets in the passenger compartment while a battery consumption amount in the parking can be reduced. As a result, uncomfortable feeling is not given to the passenger getting in the passenger compartment while the battery consumption amount can be reduced.

According to another aspect of the present invention, a ventilation and deodorization system includes a receiving unit disposed to receive a remote operation signal from a portable terminal, a door lock switching unit for performing a locking and an unlocking of a vehicle door, an air cleaning device which introduces inside air of a passenger compartment of the vehicle and blows the introduced inside air into the passenger compartment after cleaning in an air cleaning operation, and a control device for controlling operation of the door lock switching unit and the air cleaning device. In this system, when a door unlocking request signal is received as the remote operation signal by the receiving unit, the door lock switching unit is controlled by the control device to perform the unlocking of the vehicle door, and the air cleaning device is controlled by the control device to perform the air cleaning operation. Thus, the odor in the passenger compartment can be cleaned and removed before the passenger gets in the passenger compartment while the battery consumption amount can be effectively reduced. Hear, the air cleaning device can be provided in the air conditioner or can be provided separately from the air conditioner.

Preferably, the control device has a door opening/closing detection unit for detecting a door opening of the vehicle. In this case, when the door opening/closing detection unit detects the door opening of the vehicle in the ventilation operation or the air cleaning operation, the control unit releases the ventilation operation or the air cleaning operation. Therefore, when the passenger gets in the passenger compartment, the ventilation operation or the air cleaning operation can be stopped, and it can prevent the passenger from mistakenly determining that the air conditioner has a trouble. Alternatively, the control device releases the ventilation operation or the air cleaning operation when a predetermined time passes after the ventilation operation or the air cleaning operation is performed, or when the door lock switching unit performs the locking of the vehicle door in the ventilation operation or the air cleaning operation. In this case, the battery consumption amount can be effectively reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

Figure 1A:
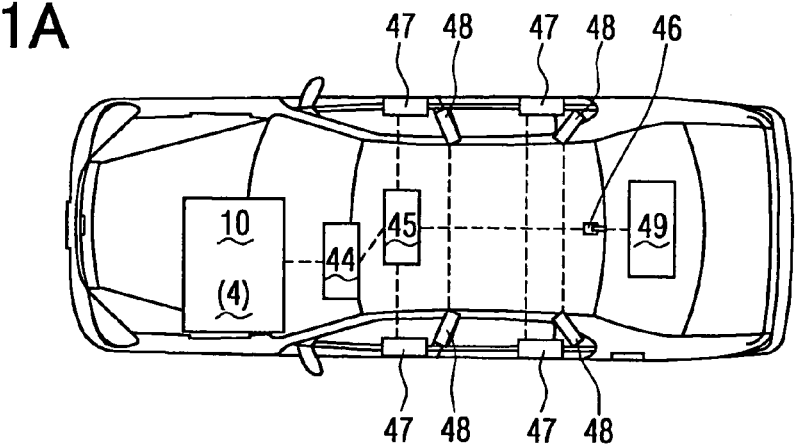
FIG. 1A is a top view of a vehicle showing a schematic structure of a vehicle ventilation and deodorization system.

FIG. 1A shows a vehicle in which a ventilation and deodorization system according to the present invention is provided. As shown in FIG. 1A, a transmitting-receiving device 46 is a receiving means (receiving unit) for receiving a remote operation signal from a portable terminal of a keyless entry or a smart key. A door lock motor 47 (door lock switching unit) and a door opening/closing detection unit 48 are disposed in each door of the vehicle. The door lock motor 47 performs an unlocking and a locking of a door lock of each door by receiving a remote operation signal. Further, the door opening/closing detection unit 48 is disposed to detect a door opening and closing state of the vehicle.

An on/off switch, which is operated in accordance with an opening or closing of the door, is generally attached to the vehicle in order to turn on a door-open warning lamp when the vehicle door is not fully closed. In this case, the on/off switch can be used as the door opening/closing detection unit 48. The transmitting-receiving device 46, the door lock motor 47, and the door opening/closing detection unit 48 are automatically controlled by a vehicle control unit 45 for controlling operation of each component of the vehicle.

An air conditioner 10 is mounted on the vehicle to perform air conditioning operation in a passenger compartment. The air conditioner 10 includes a blower unit 4 for introducing inside air (i.e., air inside the passenger compartment) or/and outside air (i.e., air outside the passenger compartment) and for blowing the introduced air into the passenger compartment. The air conditioner 10 is automatically controlled by an air-conditioning control unit 44. The air-conditioning control unit 44 and the vehicle control unit 45 are operatively linked with each other, and signals communicate with each other between the air-conditioning control unit 44 and the vehicle control unit 45.

Figure 3:
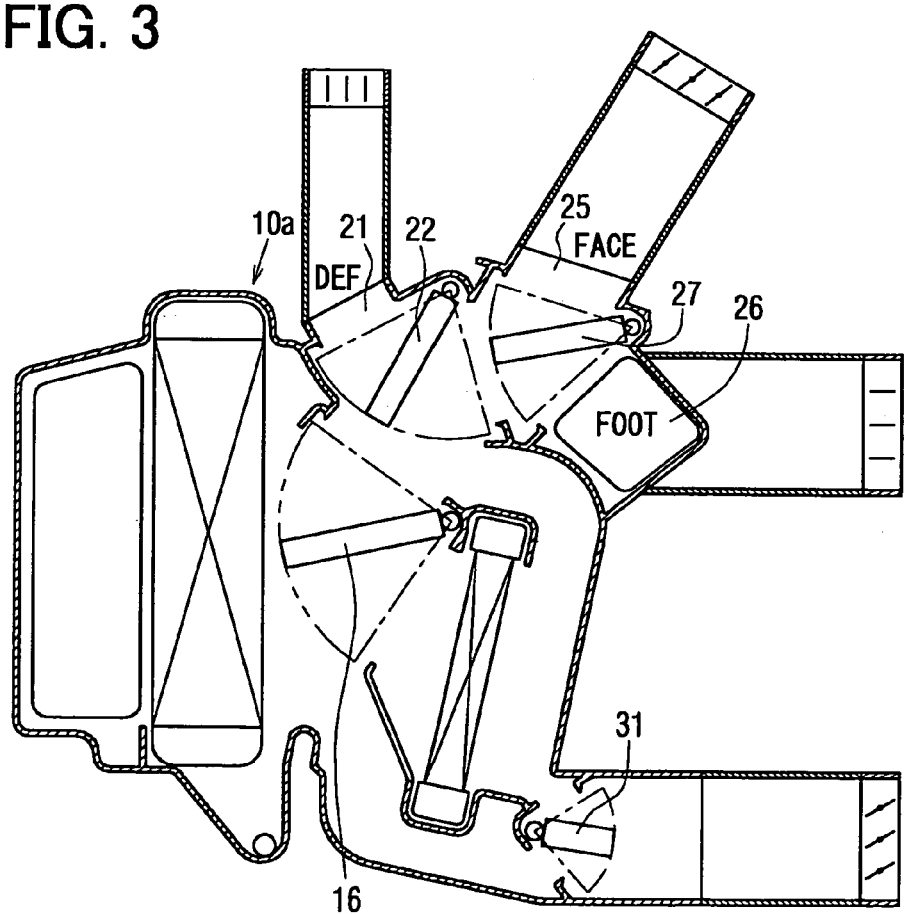
FIG. 3 is a schematic vertical sectional view showing the air conditioner in a ventilation operation, according to the first embodiment.

Next, the air conditioner 10 will be now described in detail with reference to FIGS. 2 and 3. A ventilation system of the air conditioner 10 is constructed with the blower unit 4 and an air conditioning unit 10a. The air conditioning unit 10a is disposed at a lower side of a dashboard in the passenger compartment at an approximate center portion in a vehicle right-left direction (lateral direction). In contrast, the blower unit 4 is disposed at a lower side of the dashboard in the passenger compartment to be offset from the center portion to a front-passenger's seat side in the vehicle right-left direction.

The blower unit 4 is provided with an inside air suction port 5 for introducing inside air of the passenger compartment, and an outside air suction port 6 for introducing outside air of the vehicle. The inside air suction port 5 and the outside air suction port 6 are selectively opened and closed by an inside/outside air switching door 7. The inside/outside air switching door 7 is driven by a driving member such as a servomotor 8 to open and close the inside air suction port 5 and the outside air suction port 6. For example, when an inside air circulation mode is set, the inside air suction port 5 is fully opened, and the outside air suction port 6 is fully closed. Further, when an outside air introduction mode is set, the inside air suction port 5 is fully closed, and the outside air suction port 6 is fully opened. A blower 9 is disposed downstream of the inside/outside air switching door 7 to blow the air introduced from the suction ports 5, 6 toward air outlet ports 35, 36, 37, 38 of the air conditioning unit 10a.

The air conditioning unit 10a is an integrated type in which an evaporator (cooling heat exchanger) 12 and a heater core (heating heat exchanger) 13 are integrated disposed in a single air-conditioning case 11. The air conditioning case 11 is made of a resin material having a suitable elasticity and a strong strength, such as polypropylene. The air conditioning case 11 is constructed of plural division casing parts each of which is formed by resin molding. After the evaporator 12, the heater core 13 and air-conditioning components such as doors are arranged in the plural division casing parts, the plural division casing parts are integrally connected by using a fastening member such as a metal spring clip and a screw.

Figure 2:
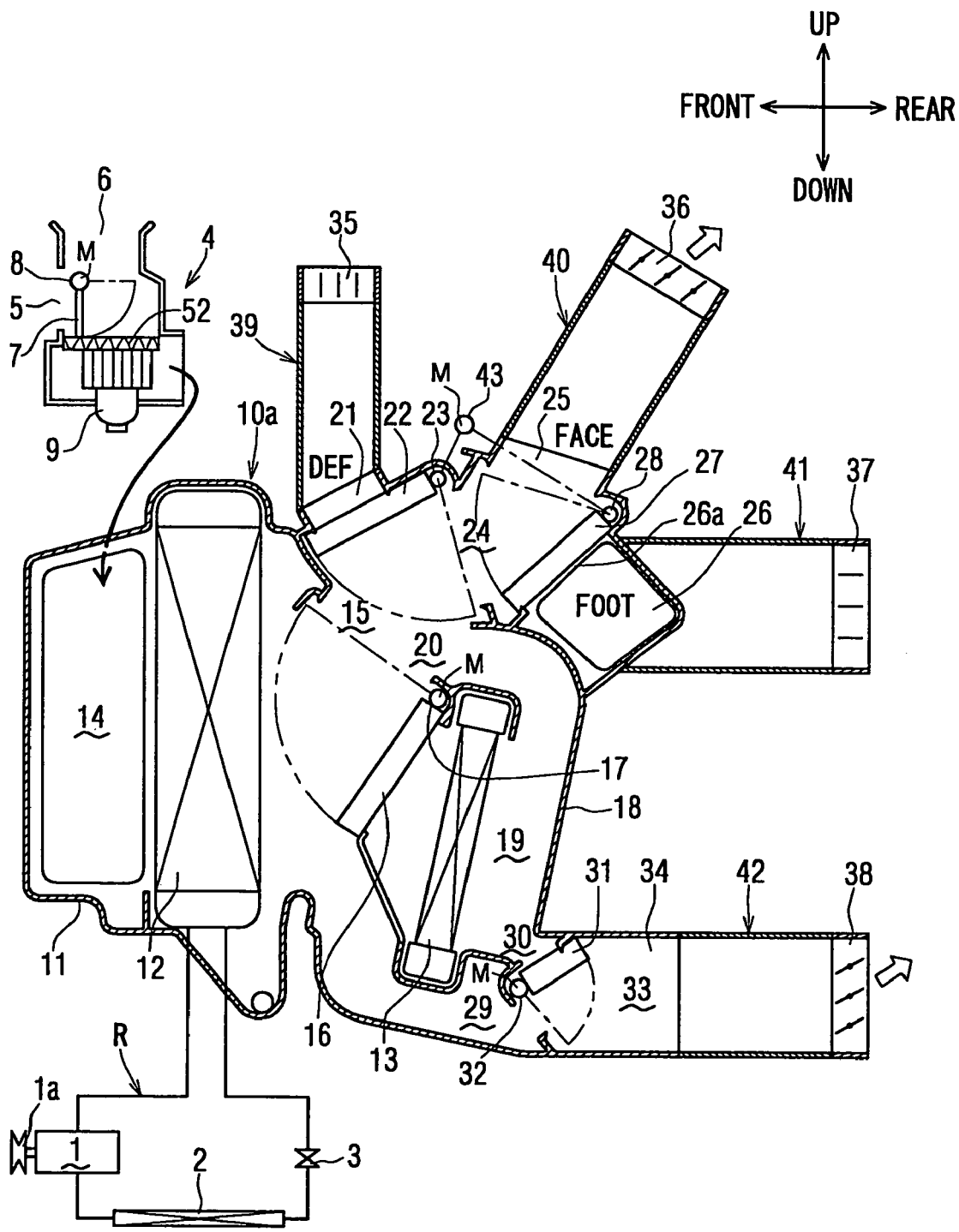
FIG. 2 is a schematic sectional view showing an air conditioner for the vehicle, according to a first embodiment of the present invention.

The air conditioning unit 10a is mounted in the vehicle as shown in FIG. 2, in the vehicle front-rear direction and a vehicle up-down direction. An air inlet port 14 is provided in the air conditioning case 11 at a most vehicle front side, and air blown by a centrifugal fan of the blower unit 4 is introduced into the air inlet port 14. The evaporator 12 is vertically disposed in the air conditioning case 11 directly after the rear side of the air inlet port 14. The evaporator 12 is thin in the vehicle front-rear direction, and is disposed in the air conditioning case 11 to cross the air passage of the air conditioning case 11 in the vehicle up-down direction and in the vehicle right-left direction. Therefore, air from the air inlet port 14 flows into the front surface of the evaporator 12, extending in the vehicle up-down direction.

The evaporator 12 is a part of a refrigerant cycle R. The refrigerant cycle R also includes a compressor 1 for compressing refrigerant, a condenser 2 for cooling and condensing refrigerant discharged from the compressor 1, an expansion valve 3 for decompressing refrigerant. The compressor 1, the condenser 2, the expansion valve 3 and the evaporator 12 are coupled by using refrigerant pipes so as to construct the refrigerant cycle R. The compressor 1 is connected to a vehicle engine (not shown) through an electromagnetic clutch 1a. By intermittently controlling on-off operation of the electromagnetic clutch 1a, a discharge capacity of the compressor 1 can be controlled. Latent heat of low-pressure refrigerant in the refrigerant cycle R is absorbed from the blown air in the evaporator 12, so that the evaporator 12 cools the blown air.

The heater core 13 is disposed downstream (at a vehicle rear side) of the evaporator 12 while being separated from the evaporator 12 by a predetermined dimension. The heater core 13 is disposed in the air conditioning case 11 to be tilted to a vehicle rear side with respect to the up-down direction (vertical direction). In this embodiment, width dimensions of the evaporator 12 and the heater core 13 in the vehicle right-left direction are set approximately equal to an inner width dimension of the air conditioning case 11 in the vehicle right-left direction.

High-temperature hot water (engine cooling water) flows from the vehicle engine (not shown) into the heater core 13, and the heater core 13 heats cool air after passing through the evaporator 12 by using the hot water as a heat source. The heater core 13 includes a heat-exchanging core portion constructed with flat tubes in which hot water flows and corrugate fins connected to the flat tubes. A front cool-air bypass passage 15, through which air (cool air) after passing through the evaporator 12 bypasses the heater core 13, is provided at an upper side within the air conditioning case 11.

A front air mixing door 16 for adjusting an air temperature to be blown to a front seat side of the passenger compartment is disposed between the evaporator 12 and the heater core 13. In the first embodiment, the front air mixing door 16 is constructed of a plate door rotatable around a rotational shaft in the vehicle up-down direction. The front air mixing door 16 adjusts a ratio between an air amount passing through the heater core 13 and an air amount passing through the front cool-air bypass passage 15 while bypassing the heater core 13, so as to adjust the temperature of air blown toward the front seat side in the passenger compartment.

The rotation shaft of the front air mixing door 16 is rotatably disposed in the air conditioning case 11, and one end portion of the rotation shaft of the front air mixing door 16 protrudes outside the air conditioning case 11 to be coupled to an actuator mechanism 17 through a link mechanism. Therefore, a rotation position of the front air mixing door 16 is adjusted by the actuator mechanism 17 through the link mechanism. For example, the actuator mechanism 17 is an actuator including a servomotor.

A wall portion 18 extending in the vehicle up-down direction is provided in the air conditioning case 11 at a position downstream from the core portion 13 to be separated from the core portion 13 by a predetermined distance. By using the wall portion 18, a warm air passage 19, in which warm air from the heater core 13 flows, is formed in the air conditioning case 11. An upper side of the warm air passage 19 is used as a front warm air passage through which warm air is supplied to the front seat side of the passenger compartment, and a lower side of the warm air passage 19 is used as a rear warm air passage 30 through which warm air is supplied to a rear seat side in the passenger compartment.

A downstream side of the front warm air passage and a downstream side of the front cool-air bypass passage 15 are joined in a front air mixing portion 20, so that cool air and warm air are mixed in the front air mixing portion 22, above the heater core 13. An upper surface portion of the air conditioning case 11 has a defroster opening portion 21 above the front air mixing portion 20, and a defroster duct 39 is connected to the upper surface portion at the defroster opening portion 21. The defroster duct 39 has a defroster outlet 35 at its downstream top end, and conditioned air from the front air mixing portion 20 is blown from the defroster outlet 35 to an inner surface of a front windshield.

The defroster opening portion 21 is opened and closed by a rotatable plate defroster door 22. The defroster door 22 is rotated by a rotation shaft 23 that is disposed horizontally at a position near the upper surface portion of the air conditioning case 11. The defroster door 22 is provided to open and close the defroster opening portion 21 and a communication port 24. Through the communication port 24, conditioned air can be introduced from the front air mixing portion 20 toward a front face opening portion 25 and a front foot opening portion 26.

The upper surface portion of the air conditioning case 11 has the front face opening portion 25 at a vehicle rear side (at a passenger side) with respect to the defroster opening portion 21. A front face duct 40 is connected to the upper surface portion at the front face opening portion 25, and has a front face outlet 36 at its downstream top end. The front face outlet 36 is arranged at an upper side of the dashboard (instrument panel), so that conditioned air is blown from the front face outlet 36 to the upper half body of a passenger sitting on the front seat.

Further, the air conditioning case 11 has the front foot opening portion 26 below the front face opening portion 25, and a foot duct 41 is connected to the air conditioning case 11 at the front foot opening portion 26. The foot duct 41 has a front foot outlet 37 at its downstream lower end, so that conditioned air is blown from the front foot outlet 37 to each foot area of the right and left front seats in the passenger compartment.

A plate face/foot door 27 is disposed to be rotatable between the front face opening portion 25 and the front foot opening portion 26 so as to open and close the front face opening portion 25 and an inlet portion 26a of the front foot opening portion 26. Here, the defroster door 22 and the front face/foot door 27 construct a front air-outlet mode switching member. The rotation shafts 23, 28 of the doors 22, 27 are connected to an actuator mechanism 43 through a link mechanism, so that the doors 22, 27 are operatively linked with each other.

A rear cool-air bypass passage 29, through which cool air from the air outlet of the evaporator 12 flows toward a rear seat side while bypassing the heater core 13, is provided at a lower side of the heater core 13 in the air conditioning case 11. A rear air mixing door 31 is a plate door disposed rotatably around a rotation shaft at a join portion between the rear warm air passage 30 and the rear cool-air bypass passage 29. The rear air mixing door 31 adjusts a flow ratio between a warm air amount from the rear warm air passage 30 and a cool air amount from the rear cool-air bypass passage 29, so as to adjust the temperature of air blown toward the rear seat side in the passenger compartment.

Warm air from the rear warm air passage 30 and cool air from the rear cool-air bypass passage 29 are mixed in a rear air mixing portion 33, so that conditioned air having a desired temperature can be obtained for the rear seat side. A rotation shaft of the rear air mixing door 31 is disposed horizontally to extend in the vehicle right-left direction. One end of the rotation shaft of the rear air mixing door 31 protrudes to an outside of the air conditioning case 11, and is connected to an independent actuator mechanism 32 through a link mechanism. For example, the actuator mechanism 32 is an actuator using a servomotor. A rotation position of the rear air mixing door 35 can be independently adjusted by the actuator mechanism 32.

Conditioned air mixed in the rear air mixing portion 33 to have a desired temperature flows into a rear opening portion 34, and is blown toward the head portion or the foot portion of a passenger on the rear seat from a rear face/foot air outlet 38 through a rear air duct 42.

Figure 1B:
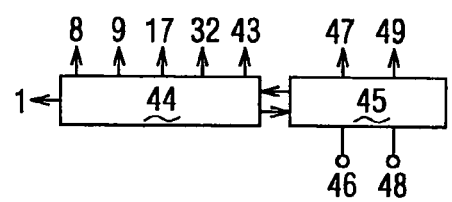
FIG. 1B is a schematic diagram showing a control device including an air-conditioning control unit and a vehicle control unit, according to embodiments of the present invention.

The air-conditioning control unit 44 is constructed with a microcomputer. When a vehicle key switch is turned on, electrical power is supplied from a vehicle battery to the air-conditioning control unit 44 so that the air-conditioning control unit 44 starts its control operation. At this time, sensor signals from sensors and operation signals from front and rear operation panels are input into the air-conditioning control unit 44. For example, the sensors include an inside air temperature sensor for detecting an inside air temperature, an outside air temperature sensor for detecting an outside air temperature, a solar radiation sensor for detecting a solar radiation amount entering into the passenger compartment, a post-evaporator air temperature sensor for detecting an air temperature immediately after passing through the evaporator 12, and a water temperature sensor for detecting a water temperature entering into the heater core 13. The front air-conditioning operation panel is provided in an instrument panel portion at a vehicle front side in the passenger compartment, and the rear air-conditioning operation panel is provided at a vehicle rear seat side in the passenger compartment. Then, as shown in FIG. 1B, the compressor 1, the components of the blower unit 10 and the components of the air conditioning unit 10a are controlled by the air-conditioning control unit 44 in accordance with a predetermined control program.

In the vehicle air conditioner 10, the operation positions (rotation positions) of the front air mixing door 16 and the rear air mixing door 31 are respectively independently controlled, so that the temperature of air to be blown toward the front seat side of the passenger compartment and the temperature of air to be blown toward the rear seat side of the passenger compartment can be independently controlled. Further, by selecting the operation positions of the defroster door 22 and the face/foot door 27, an air outlet mode such as a face air outlet mode, a bi-level air outlet mode, a foot air outlet mode, a foot/defroster air outlet mode and a defroster air outlet mode can be set.

In the first embodiment of the present invention, a ventilation operation can be set as an operation mode of the air conditioner 10. FIG. 3 shows the air conditioning unit 10a in the ventilation operation. When the ventilation operation is set in the air conditioner, the inside/outside air switching door 7 is operated to the position of the outside air introduction mode where the inside air suction port 5 is closed and the outside air suction port 6 is fully opened. Further, each of the front air mixing door 16 and the rear air mixing door 31 are operation at a middle position between the warm air passage and the cool air passage. In addition, the defroster door 22 and the face/foot door 27 are operated so that all the opening portions 21, 25, 26 are opened, and the blower unit 4 is operated to have an approximate maximum air-blowing amount. That is, in the ventilation operation, the defroster door 22 and the face/foot door 27 are operated at positions between the bi-level air outlet mode or the foot/defroster air outlet mode and the foot air outlet mode, so that all the opening portions 21, 25, 26 are opened and air is blown from all the air outlets 35, 36, 37 and 38.

Next, operation of a vehicle ventilation and deodorization system according to the first embodiment of the present invention will be now described. The vehicle control unit 45 is provided to receive a remote operation signal through the transmitting-receiving device 46. When a door unlocking request signal is received as the remote operation signal to the vehicle control unit 45 through the transmitting-receiving device 46, the vehicle control unit 45 drives the door lock motor 47 to unlock the door lock, and a signal in which the door lock of the vehicle is unlocked is output from the vehicle control unit 45 to the air-conditioning control unit 44.

Figure 4:
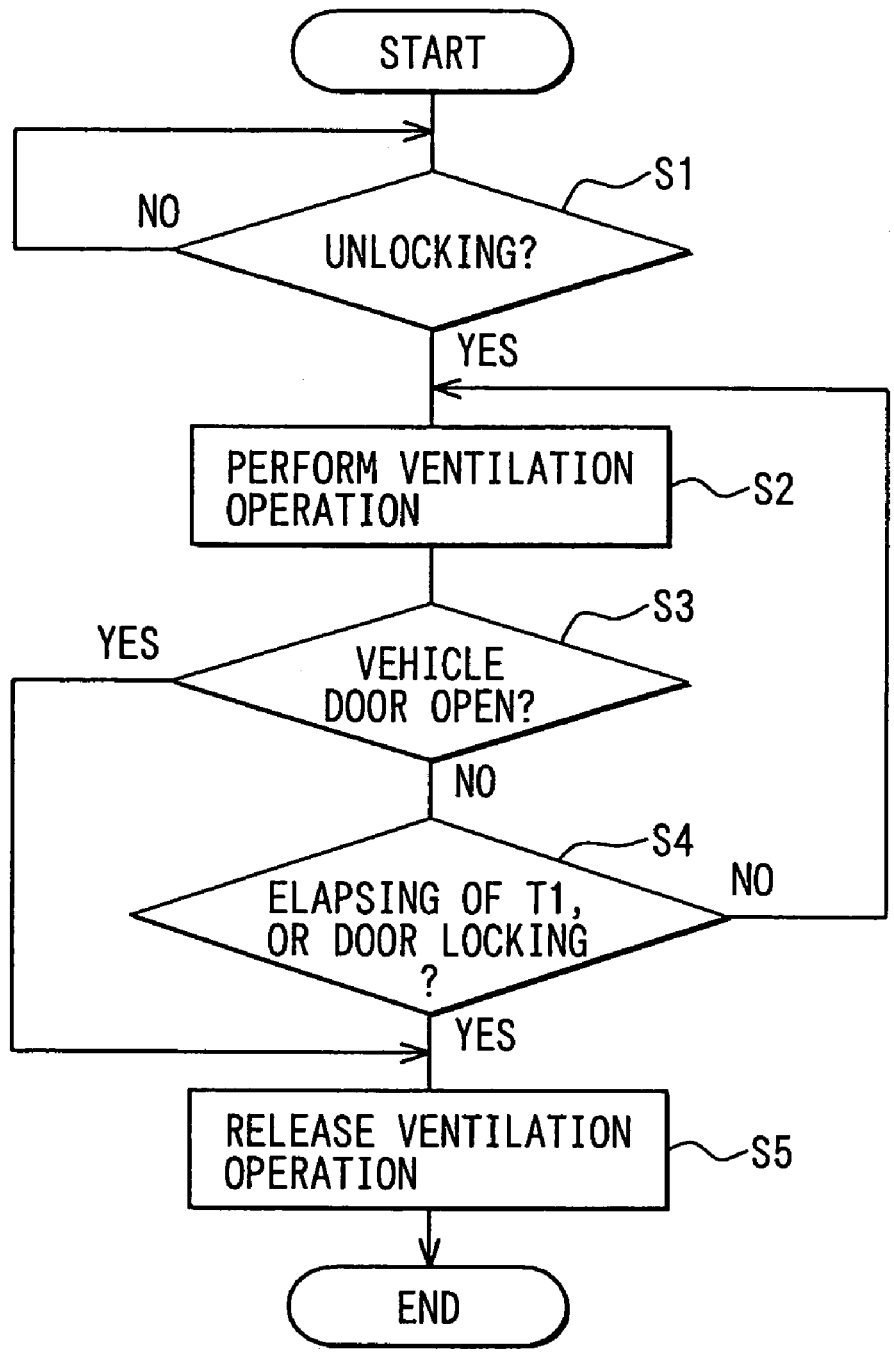
FIG. 4 is a flow diagram showing a control process of the control device according to the first embodiment.

Then, the air-conditioning control unit 44 controls air-conditioning operation of the air conditioner 10 based on the control process in FIG. 4. Specifically, as shown in FIG. 4, at step S1, the air-conditioning control unit 44 determines whether or not an unlocking signal in which the door lock of the vehicle is unlocked is input. When the unlocking signal is input to the air-conditioning control unit 44, the ventilation operation of the air conditioner 10 is performed at step S2. When the ventilation operation is set at step S2, only outside air of the passenger compartment is introduced, and the introduced outside air is blown into the passenger compartment by an approximate maximum blowing amount in the air conditioner 10.

The vehicle control unit 45 outputs a vehicle door open signal to the air-conditioning control unit 44, when the door opening/closing detection unit 48 determines that the vehicle door is opened. When the vehicle door open signal that the vehicle is opened is input to the air-conditioning control unit 44 from the vehicle control unit 45 at step S3, that is, when the vehicle door is opened, the ventilation operation is released and stopped at step S5. When the vehicle door open signal is not input to the air-conditioning control unit 44 from the vehicle control unit 45, the air-conditioning control unit 44 determines whether or not a predetermined time T1 (e.g., 30 seconds) passes after the ventilation operation is performed at step S4. When the predetermined time T1 passes after performing the ventilation operation, the ventilation operation is released and is stopped at step S5. Alternatively, it is determined whether or not the vehicle door is locked in the ventilation operation by driving the door lock motor 47 at step S4. When the door locking is determined in the ventilation operation at step S4 by the vehicle control unit 45 and the door locking signal is input to the air-conditioning control unit 44 at step S4, the ventilation operation is released and stopped at step S5.

According to the first embodiment of the present invention, the vehicle ventilation and deodorization system includes the transmitting-receiving device 46 for receiving a remote operation signal from the keyless entry, the smart key or the portable terminal, the door lock motor 47 for performing the locking and the unlocking of the vehicle door, the air conditioner 10 for introducing outside air and for blowing the introduced air into the passenger compartment in the ventilation operation, and the control units 44, 45 for controlling its operation. Here, a control device can be constructed with both the control units 44, 45. When a vehicle-door unlocking request signal is received as the remote operation signal by the transmitting-receiving device 46, the control device controls the door lock motor 47 to perform the unlocking of the vehicle door, and the ventilation operation is performed by using the air conditioner 10. That is, in the ventilation operation, the outside air is introduced, and is blown into the passenger compartment by an approximate maximum air amount of the blower unit 4.

From a time where the door lock is released by a remote operation of the portable terminal such as the keyless entry or the smart key, the ventilation operation is performed. That is, immediately before a passenger gets in the passenger compartment, the ventilation operation is performed, so that the outside air introduction mode is set and the passenger compartment is ventilated by the approximate maximum air amount. Therefore, the odor in the passenger compartment can sweep away at a time immediately before the passenger gets in the passenger compartment while a battery consumption amount in the parking can be reduced. Thus, uncomfortable feeling is not given to the passenger getting in the passenger compartment while the battery consumption amount can be reduced.

The air conditioner 10 has the plural air outlets 35–38, and doors 22, 27, 31 for opening and closing the air outlets 35–38. Furthermore, in the ventilation operation, the air-conditioning control unit 44 controls the doors 22, 27, 31 so that air is blown from all the air outlets 35, 36, 37 and 38.

In a case where the air conditioner 10 stops in a foot air outlet mode, if a ventilation operation for blowing air into the passenger compartment is performed while the foot air outlet mode is maintained, air with the odor will stay in the defroster duct 39, the face duct 40 and the rear air duct 42 extending from the opening portions 21, 25, 34, except for the foot opening portion 26. In this case, this stayed air will be not ventilated, and is blown into the passenger compartment when the air outlet mode is switched. However, according to the first embodiment of the present invention, when the ventilation operation is set, the air outlet mode is switched to a ventilation mode position where all the opening portions 21, 25, 26 and 34 are opened and air is blown from all the air outlets 35, 36, 37 and 38. Accordingly, the odor staying in the air conditioning unit 10a and in each of the air ducts 39, 40, 41, 42 can be completely ventilated.

In addition, when it is determined by the door opening/closing detection unit 48 that the vehicle door is opened, the control device releases the ventilation operation. Because the ventilation operation or/and the air cleaning operation is performed from the time where the door lock is released by the remote operation to the time where the vehicle door is opened, an air conditioning can be suitably performed after the passenger gets in the passenger compartment while the battery consumption amount in the parking can be effectively reduced.

In the first embodiment, as shown in FIG. 4, the control device of the control units 44, 45 performs the ventilation operation for a predetermined time after the door lock is released by the remote operation. Thus, even when the vehicle door is not opened immediately after the door lock is released by the remote operation, it can restrict the battery consumption amount from being largely increased.

Furthermore, when the vehicle door is locked by the door lock motor 47 in the ventilation operation, the ventilation operation is released and is stopped. Thus, when the vehicle door has a wireless door-lock structure where the door is locked again when the vehicle door is not opened for a predetermined time (e.g., 30 seconds) after the vehicle door-unlocking request signal is output, the ventilation operation or the air cleaning operation can be automatically released and stopped when the door is locked again. In this case, the battery consumption amount in the parking can be effectively reduced, and a timer function can be omitted in the air conditioner 10.

(Second Embodiment)

Figure 5:
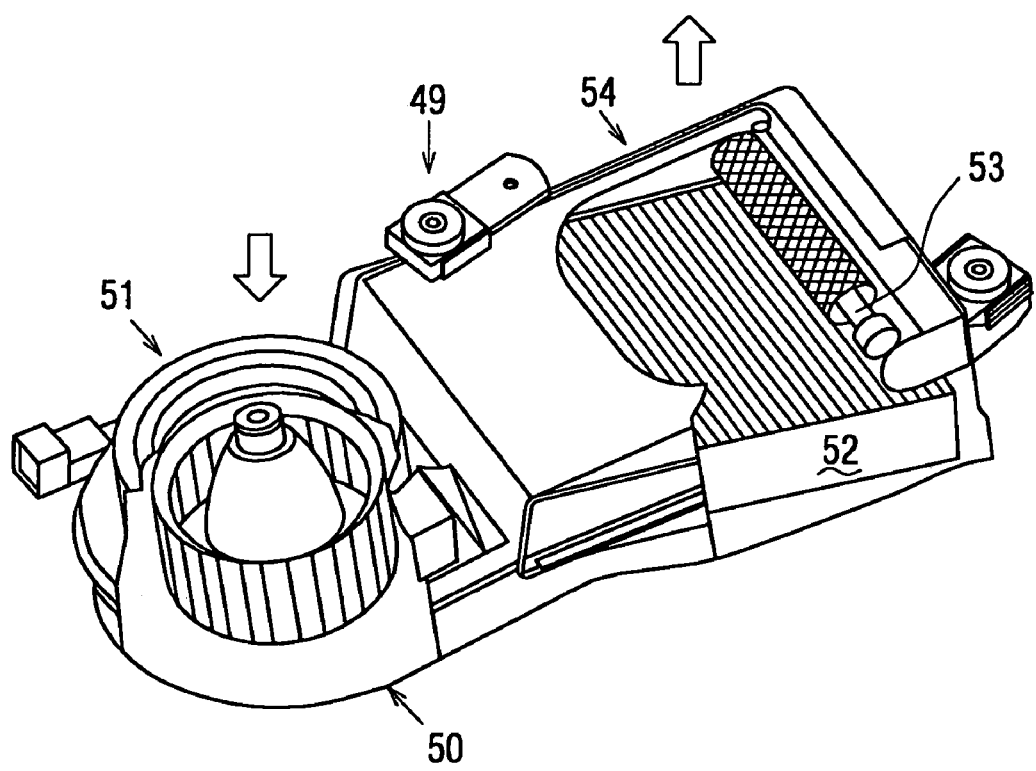
FIG. 5 is a perspective view showing an air cleaner according to a second embodiment of the present invention.

The second embodiment of the present invention will be now described with reference to FIGS. 5 and 6. In the second embodiment, an air cleaner 49 shown in FIG. 5 is provided. The air cleaner 49 is mounted on a rear tray in the passenger compartment or a ceiling portion in the passenger compartment of the vehicle shown in FIG. 1A. For example, the air cleaner 49 is attached to an interior decoration portion of the rear tray or the ceiling portion.

The air cleaner 49 includes a case 50 for defining an air passage. The case 50 has a suction port 51 for drawing inside air of the passenger compartment, and a blowing unit for drawing and blowing the drawn air. The blowing unit includes a well-known fan and a motor. An air cleaning filter 52 for removing dust compounds from air passing therethrough is provided to clean the air. For example, a porous material such as activated carbon, silica gel and zeolite can be used as the material of the air cleaning filter 52. As the air cleaning filter 52, a photocatalyst filter having a photocatalyst composed of a metal oxide can be used. In this case, all the photocatalyst filter can be made of the metal oxide, or the metal oxide can adhere to the surface of the photocatalyst filter.

An ultraviolet lamp 53 for activating the photocatalyst is disposed at a downstream side of the air cleaning filter 52. An air outlet 54 through which the cleaned air is blown into the passenger compartment is provided at the other end side of the case 50. In the second embodiment, operation of the air cleaner 49 can be automatically controlled by the vehicle control unit 45.

Next, operation according to the second embodiment of the present invention will be now described. The vehicle control unit 45 is provided to receive a remote operation signal by using the transmitting-receiving device 46. When a door unlocking request signal is received as the remote operation signal to the vehicle control unit 45, the vehicle control unit 45 drives the door lock motor 47 to unlock the door lock of the vehicle, and performs the control operation in FIG. 6. Specifically, as shown in FIG. 6, at step S11, it is determined whether or not an unlocking signal is received as the remote operation signal. When the unlocking signal is received, the door lock is released by using the door lock motor 47, and an air cleaning operation of the air cleaner 49 is performed at step S12. When the cleaning operation is set at step S12, inside air of the passenger compartment is introduced into the air cleaner 49, and the cleaned air is blown into the passenger compartment by an approximate maximum air amount of the blowing unit.

When the vehicle control unit 45 determines that the vehicle door is opened by using the door opening/closing detection unit 48, the air cleaning operation is released and stopped at step S15. When the vehicle door open signal is not determined by the vehicle control unit 45, it is determined whether or not a predetermined time T1 (e.g., 30 seconds) passes after the air-cleaning operation is performed at step S14. When the predetermined time T1 passes after performing the air-cleaning operation, the air cleaning operation is released and stopped at step S15. Alternatively, it is determined whether or not the vehicle door is locked again by driving the door lock motor 47 at step S14. When the door locking is determined at step S14 by the vehicle control unit 45, the air-cleaning operation is released and is stopped at step S15.

According to the second embodiment of the present invention, the vehicle ventilation and deodorization system includes the transmitting-receiving device 46 for receiving a remote operation signal from the portable terminal such as the keyless entry or the smart key, the door lock motor 47 for performing the locking and unlocking of the vehicle door, the air cleaner 49 for cleaning inside air and for blowing the cleaned air into the passenger compartment in the air-cleaning operation, and the control unit 45 for controlling its operation. When a vehicle-door unlocking request signal is received as the remote operation signal by the transmitting-receiving device 46, the door lock motor 47 is controlled to perform the unlocking of the vehicle door, and the air cleaning operation is performed by using the air cleaner 49. That is, in the air cleaning operation, the inside air is introduced into the air cleaner 49 to be cleaned, and the cleaned air is blown into the passenger compartment by an approximate maximum air amount of blowing unit.

From a time where the door lock is released by a remote operation of the portable terminal such as the keyless entry or the smart key, the air cleaning operation of the air cleaner 49 is performed. That is, immediately before a passenger gets on the passenger compartment, the air cleaning operation is performed, so that the inside air of the passenger compartment is cleaned by the approximate maximum air blowing amount. Therefore, the odor in the passenger compartment can cleaned at a time immediately before the passenger gets in the passenger compartment while the battery consumption amount in the parking can be reduced. Thus, uncomfortable feeling is not given to the passenger getting in the passenger compartment while the battery consumption amount can be reduced.

(Third Embodiment)

The third embodiment of the present invention will be now described with reference to FIGS. 1A, 1B and 6. In the above-described second embodiment, the air cleaner 49 is disposed separately from the air conditioner 10. However, in the third embodiment, as shown in FIG. 1, an air cleaning filter 52 is provided in the air conditioner 10, and the air cleaning operation is performed by using the air cleaning filter 52 provided in the air conditioner 10. Similarly to the second embodiment, the air cleaning filter 52 can be made of a porous material such as activated carbon, silica gel and zeolite to remove dust compounds in air passing therethrough.

Next, operation according to the third embodiment of the present invention will be now described. The vehicle control unit 45 is provided to receive a remote operation signal through the transmitting-receiving device 46. When a door unlocking request signal is received as the remote operation signal to the vehicle control unit 45 by the transmitting-receiving device 46, the vehicle control unit 45 drives the door lock motor 47 to unlock the door lock, and a signal in which the door lock of the vehicle is unlocked is output from the vehicle control unit 45 to the air-conditioning control unit 44.

Figure 6:
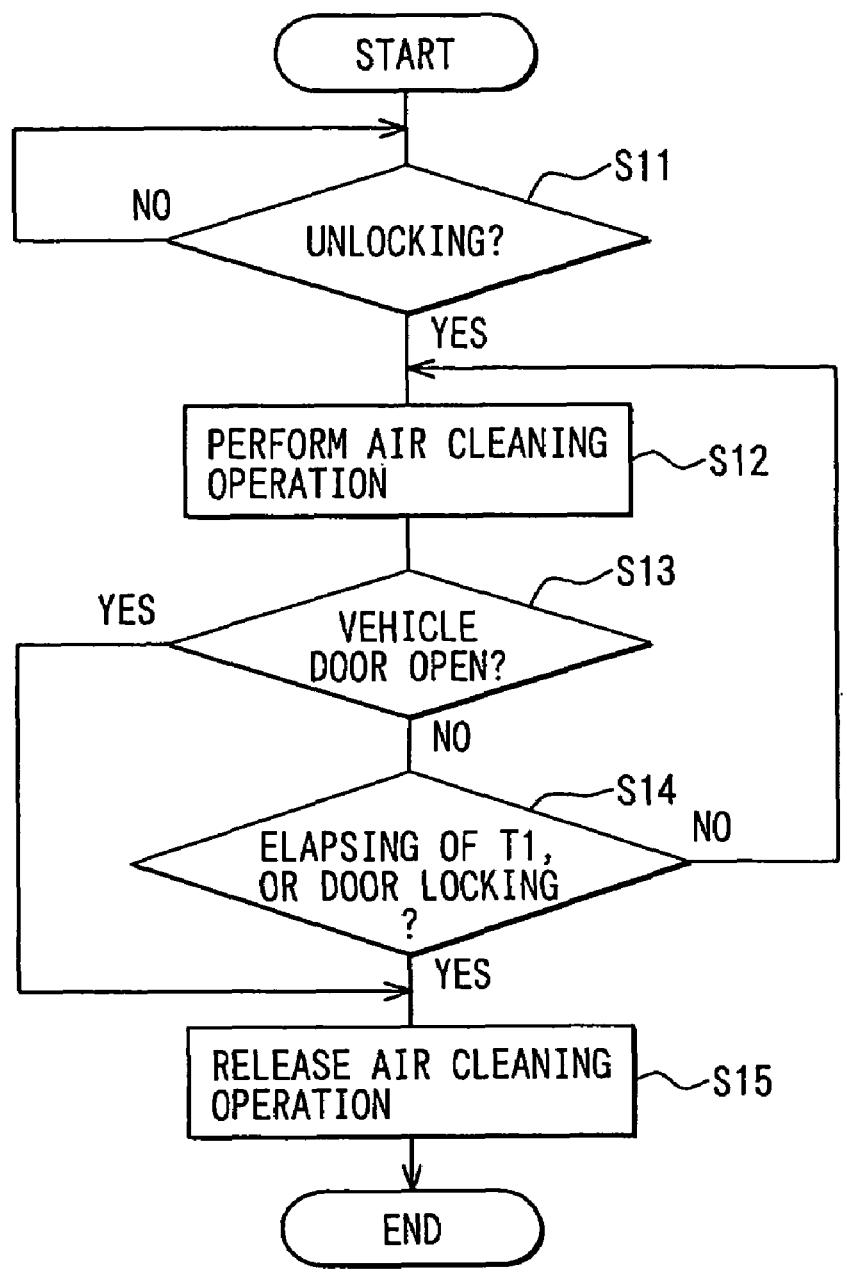
FIG. 6 is a flow diagram showing a control process of a control device according to second and third embodiments.

Then, the air-conditioning control unit 44 controls the air conditioner 10 based on the control process in FIG. 6. Specifically, as shown in FIG. 6, at step S11, the air-conditioning control unit 44 determines whether or not an unlocking signal in which the door lock of the vehicle is unlocked is input. When the unlocking signal is detected, an air cleaning operation is performed at step S12. When the air cleaning operation is set at step S12, inside air of the passenger compartment is introduced and the introduced inside air is blown into the passenger compartment after passing through the air cleaning filter 52 by an approximate maximum blowing amount, in the air conditioner 10.

The vehicle control unit 45 outputs a vehicle door open signal to the air-conditioning control unit 44, when the vehicle control unit 45 determines that the vehicle door is opened by using the door opening/closing detection unit 48. When the vehicle door open signal that the vehicle is opened is input to the air-conditioning control unit 44 from the vehicle control unit 45 at step S13, that is, when the vehicle door is opened, the air cleaning operation is released and stopped at step S15. When the vehicle door open signal is not input to the air-conditioning control unit 44 from the vehicle control unit 45, the air-conditioning control unit 44 determines whether or not a predetermined time T1 (e.g., 30 seconds) passes after the air cleaning operation is performed at step S14. When the predetermined time T1 passes after performing the air cleaning operation at step S14, the air cleaning operation is released and stopped at step S15. Alternatively, it is determined whether or not the vehicle door is locked by driving the door lock motor 47 at step S14. When the door locking is determined at step S14 by the vehicle control unit 45 and the door locking signal is input to the air-conditioning control unit 44 at step S14, the air cleaning operation is released and is stopped at step S15.

According to the third embodiment of the present invention, the vehicle ventilation and deodorization system includes the transmitting-receiving device 46 for receiving a remote operation signal from the portable terminal such as the keyless entry or the smart key, the door lock motor 47 for performing the locking and unlocking of the vehicle door, the air conditioner 10 having the air cleaning filter 52, and the control units 44, 45 for controlling its operation. Here, a control device can be constructed with both the control units 44, 45. When a vehicle-door unlocking request signal is received as the remote operation signal by the transmitting-receiving device 46, the control device controls the door lock motor 47 to perform the unlocking of the vehicle door, and the air cleaning operation is performed by using the air conditioner 10 having the air cleaning filter 52. That is, in the air cleaning operation, the inside air is introduced into the air conditioner 10 to be cleaned in the air cleaning filter 52, and the cleaned air is blown into the passenger compartment by an approximate maximum air amount of the blower unit 4.

From a time where the door lock is released by a remote operation of the portable terminal such as the keyless entry or the smart key, the air cleaning operation is performed. That is, immediately before a passenger gets in the passenger compartment, the air cleaning operation is performed, so that the inside air of the passenger compartment is cleaned. Therefore, the odor in the passenger compartment can be removed at a time immediately before the passenger gets in the passenger compartment while the battery consumption amount in the parking can be reduced. Thus, uncomfortable feeling is not given to the passenger getting in the passenger compartment while the battery consumption amount can be reduced.

In the third embodiment, when the air cleaning operation is set, the doors 22, 27, 31 are operated so that air is blown from all the air outlets 35, 36, 37 and 38, similarly to the first embodiment.

Although the present invention has been fully described in connection with the preferred embodiments thereof with reference to the accompanying drawings, it is to be noted that various changes and modifications will become apparent to those skilled in the art.

For example, in the above-described embodiments of the present invention, a time immediately before the passenger gets in the passenger compartment is detected by detecting a releasing of the door lock, and the ventilation operation or the air cleaning operation is performed. However, in a case where it is determined that a passenger is close to the vehicle by using GPS or a portable terminal, the ventilation operation or the air cleaning operation can be performed. Further, in the first embodiment or the third embodiment, the present invention can be applied to the air conditioner 10 without a rear air-conditioning function. In addition, the operation of the air conditioner 10 of the first embodiment and the operation of the air cleaner 49 of the second embodiment can be combined. That is, both the ventilation operation according to the first embodiment and the air cleaning operation according to the third embodiment can be simultaneously performed.

In the above-described first embodiment of the present invention, in the ventilation operation, exhaust air of the passenger compartment is naturally exhausted from a discharge port provided in a door trim or a rear tray. However, an exhaust blower can be additionally provided in the rear tray, for example. In this case, the exhaust air can be also forcibly discharged by using the exhaust blower in the ventilation operation, thereby further improving ventilating capacity in the ventilation operation.

In the above-described third embodiment of the present invention, the air cleaning filter 52 is provided in the air conditioner 10. However, a deodorization unit constructed with a deodorization filter and a blower can be used. Further, the air cleaner 49 can be provided at the other position in the vehicle.

In the above-described embodiments of the present invention, in the ventilation operation or the air cleaning operation, the air bowing amount is set approximately in maximum. However, the ventilation operation or the air cleaning operation can be performed by an air blowing amount different from the approximately maximum air-blowing amount.

Such changes and modifications are to be understood as being within the scope of the present invention as defined by the appended claims.

What is claimed is:

1. A ventilation and deodorization system for a vehicle, comprising:
    a receiving unit disposed to receive a remote operation signal from a portable terminal;
    a door lock switching unit for performing a locking and an unlocking of a vehicle door;
    an air conditioner which introduces outside air of a passenger compartment of the vehicle and blows the introduced outside air into the passenger compartment in a ventilation operation; and
    a control device for controlling operation of the door lock switching unit and the air conditioner, wherein,
    when the receiving unit receives a door unlocking request signal as the remote operation signal, both the door lock switching unit is controlled by the control device to perform the unlocking of the vehicle door, and at the same time the air conditioner is controlled by the control device to perform the ventilation operation.

2. The ventilation and deodorization system according to claim 1, wherein:
    the air conditioner includes a plurality of air outlets from which air is blown into the passenger compartment, and an air outlet opening/closing unit for opening and closing the air outlets; and
    in the ventilation operation, the air outlet opening/closing unit is controlled by the control device to open all the air outlets such that air is blown from all the air outlets.

3. The ventilation and deodorization system according to claim 1, wherein:
    the control device releases the ventilation operation when a predetermined time passes after the ventilation operation is performed.

4. The ventilation and deodorization system according to claim 1, wherein:
    in the ventilation operation, the air conditioner blows the introduced outside air substantially by a maximum air-blowing capacity.

5. A ventilation and deodorization system for a vehicle, comprising:
    a receiving unit disposed to receive a remote operation signal from a portable terminal;
    a door lock switching unit for performing a locking and an unlocking of a vehicle door;
    an air conditioner which introduces outside air of a passenger compartment of the vehicle and blows the introduced outside air into the passenger compartment in a ventilation operation; and
    a control device for controlling operation of the door lock switching unit and the air conditioner, wherein,
    when the receiving unit receives a door unlocking request signal as the remote operation signal, the door lock switching unit is controlled by the control device to perform the unlocking of the vehicle door, and the air conditioner is controlled by the control device to perform the ventilation operation;
    the control device has a door opening/closing detection unit for detecting a door opening of the vehicle,
    when the door opening/closing detection unit detects the door opening of the vehicle in the ventilation operation, the control unit releases the ventilation operation.

6. A ventilation and deodorization system for a vehicle, comprising:
    a receiving unit disposed to receive a remote operation signal from a portable terminal;
    a door lock switching unit for performing a locking and an unlocking of a vehicle door;
    an air conditioner which introduces outside air of a passenger compartment of the vehicle and blows the introduced outside air into the passenger compartment in a ventilation operation; and
    a control device for controlling operation of the door lock switching unit and the air conditioner, wherein,
    when the receiving unit receives a door unlocking request signal as the remote operation signal, the door lock switching unit is controlled by the control device to perform the unlocking of the vehicle door, and the air conditioner is controlled by the control device to perform the ventilation operation;
    the control device releases the ventilation operation when the door lock switching unit performs the locking of the vehicle door in the ventilation operation.

7. A ventilation and deodorization system for a vehicle, comprising
    a receiving unit disposed to receive a remote operation signal from a portable terminal;
    a door lock switching unit for performing a locking and an unlocking of a vehicle door;
    an air cleaning device which introduces inside air of a passenger compartment of the vehicle, and blows the introduced inside air into the passenger compartment after cleaning in an air cleaning operation;
    an air conditioner which introduces outside air of the passenger compartment of the vehicle and blows the introduced outside air into the passenger compartment in a ventilation operation; and
    a control device for controlling operation of the door lock switching unit, the air cleaning device and the air conditioner, wherein:
    when the receiving unit receives a door unlocking request signal as the remote operation signal, both the door lock switching unit is controlled by the control device to perform the unlocking of the vehicle door, and at the same time at least one of the air cleaning operation and the ventilation operation is performed.

8. The ventilation and deodorization system according to claim 7, wherein the air cleaning device is an air cleaner mounted in the vehicle to be separated from the air conditioner.

9. The ventilation and deodorization system according to claim 7, wherein:
    the air cleaning device is provided in the air conditioner for performing an air conditioning operation of the passenger compartment;

the air conditioner includes a filter for filtering air, and a blowing unit for blowing air into the passenger compartment; and in the air cleaning operation, the blowing unit blows the inside air after passing through the filter into the passenger compartment.

10. The ventilation and deodorization system according to claim 7, wherein:

the control device has a door opening/closing detection unit for detecting a door opening of the vehicle, when the door opening/closing detection unit detects the door opening of the vehicle in the air cleaning operation, the control unit releases the air cleaning operation.

11. The ventilation and deodorization system according to claim 7, wherein:

the control device releases the air cleaning operation when a predetermined time passes after the air cleaning operation is performed.

12. The ventilation and deodorization system according to claim 7, wherein:

the control device releases the air cleaning operation when the door lock switching unit performs the locking of the vehicle door in the air cleaning operation.

13. The ventilation and deodorization system according to claim 7, wherein:

in the air cleaning operation, the air conditioner blows the introduced inside air substantially by a maximum air-blowing capacity.

* * * * *